United States Patent [19]

Farabaugh

[11] 4,065,391

[45] Dec. 27, 1977

[54] FLUID DISTRIBUTOR

[75] Inventor: Patrick Farabaugh, Dallas, Tex.

[73] Assignee: Sybron Corporation, Rochester, N.Y.

[21] Appl. No.: 710,473

[22] Filed: Aug. 4, 1976

Related U.S. Application Data

[63] Continuation-in-part of Ser. No. 611,585, Sept. 8, 1975, abandoned, and Ser. No. 611,597, Sept. 8, 1975, abandoned.

[51] Int. Cl.$^2$ .................. B01D 23/16; B01D 23/20
[52] U.S. Cl. .................................... 210/274; 210/293
[58] Field of Search ............... 210/274, 275, 289, 291, 210/293

[56] References Cited

U.S. PATENT DOCUMENTS

| 801,810 | 10/1905 | Parmelee | 210/274 |
|---|---|---|---|
| 2,710,692 | 6/1955 | Kegel et al. | 210/274 |
| 3,110,667 | 11/1963 | Stuppy | 210/275 |
| 3,925,202 | 12/1975 | Hirs | 210/275 |

OTHER PUBLICATIONS

Leopold Dual-Parallel Lateral Filter Bottom, Bulletin, F. B. Leopold Co., Inc., Zelienople, Pa.

L. Streicher, "Treatment Plant Design," AWWA Journal, pp. 629-640, Nov. 1974.

Primary Examiner—Thomas G. Wyse
Assistant Examiner—Ivars Cintins
Attorney, Agent, or Firm—Theodore B. Roessel; James A. Rich

[57] ABSTRACT

A distributor that supplies either a liquid or a gas to a bed of granular media, such as a sand filter, is divided by inclined interior walls into primary and secondary horizontal conduits that extend parallel to each other. Gas metering orifices are positioned at an intermediate level in the inclined walls and liquid metering orifices are positioned beneath the gas metering orifices in the inclined walls. A liquid or a gas is supplied to the primary conduits, passes through the metering orifices into the secondary conduits, and through dispersion orifices in the secondary conduits into the filter bed. At least some of the secondary conduits are each connected to at least two primary conduits so that liquid can flow from one primary conduit through a secondary conduit to another primary conduit to compensate for inequalities of flow along the primary conduits.

14 Claims, 11 Drawing Figures

FLUID DISTRIBUTOR

CROSS REFERENCE TO RELATED APPLICATIONS

This application is a continuation-in-part of my co-pending application Ser. No. 611,585, filed Sept. 8, 1975 and my copending application Ser. No. 611,597, also filed Sept. 8, 1975, both now abandoned.

BACKGROUND OF THE INVENTION

This invention relates to fluid distributors, and more particularly to distributors that provide uniform distribution of either a liquid or a gas throughout a bed of granular media.

Uniform distribution of fluid in beds of granular media is important in many fluid treating systems. For example, in filters where a liquid being treated flows down through a bed of filter media, such as sand, the bed is usually supported by a filter bottom that collects the filtered liquid and also distributes a backwashing liquid that is forced up through the bed when cleaning is necessary. Uniformity of distribution of this backwash liquid is extremely important. Nonuniform distribution can leave parts of the bed contaminated after backwashing and can disrupt the bed, which reduces the life of the filter.

In some filters, a gas such as air is forced through the bed prior to conventional liquid backwashing. The air bubbles up through the filter and provides a very thorough agitation of the media, dislodging accumulated dirt and/or gelatinous floc which then can be removed easily by liquid backwashing. This type of agitation is particularly attractive for cleaning tertiary filters, in which heavy, sticky deposits are formed in the media.

With air backwashing, uniform distribution of both air and water is important. In addition, in air backwashing it is desirable to minimize expansion of the air as it passes from the filter bottom into the bed. If the air expands significantly at this point, it can disrupt the gravel support layers frequently used beneath beds of sand filter media. As a result, many filters that utilize air cleaning either deposit the sand directly on top of the filter bottom or place the air distribution system above the gravel support layer. If the sand is placed directly on the filter bottom, the passages or orifices leading from the bottom into the bed must be extremely small to keep sand out of the filter bottom. This situation frequently leads to plugging of the underdrain. On the other hand, placing an air distribution system above the gravel support layer requires two separate systems and increases the cost of the installation.

One prior art system that provides extremely uniform distribution of a liquid backwashing medium is disclosed in U.S. Pat. No. 3,110,667 to Mark L. Stuppy. This system utilizes filter bottom blocks having upper and lower lateral conduits extending from block to block across the filter. The lower or primary lateral conduits are connected to a flume, through which the backwash liquid is supplied. Ports connect the lower laterals to the upper or secondary laterals, and additional ports connect the secondary laterals to the filter bed. Thus, the backwashing liquid passes from the flume along the lower or primary laterals, into the secondary laterals, and from there into the filter bed.

Since the upper or secondary laterals extend from block to block along the rows, the backwashing liquid can flow along them to compensate for any inequalities in the flow from the primary to the secondary laterals. If the primaries are supplied equal amounts of water, this dual lateral system provides extremely uniform distribution of the backwash liquid across the entire filter bottom. However, if there are variations in the amount of water supplied to individual primaries, as might occur due to roughness, construction tolerances or the like or if a primary was partially blocked, the flow from the secondaries to the bed will vary in a similar manner. Also, the system has no provision for air backwashing, which would be desirable in many installations.

SUMMARY OF THE INVENTION

An object of this invention is to provide a distributor that distributes either a liquid or a gas uniformly throughout a bed of granular media.

The invention uses a distributor which, like the system disclosed in the Stuppy patent, is divided into primary and secondary lateral conduits that extend parallel to each other. However, in this invention the secondary and primary conduits are placed side by side and separated from each other by inclined walls. Gas metering orifices at an intermediate level in these inclined walls control the flow of gas from the primary to the secondary laterals, and liquid metering orifices, positioned beneath and separated from the gas metering orifices in the inclined walls, control the flow of liquid from the primary to the secondary laterals. Thus, this system provides the compensatory liquid flow in the secondaries provided by the system shown in the Stuppy patent and also provides means for distributing gas uniformly.

Another object of this invention is to provide a distributor that introduces a gas into a bed of granular media with minimal expansion of the gas as it enters the bed. This is accomplished by making the total cross-sectional area of the gas metering orifices in the above-mentioned inclined walls substantially smaller than the total cross-sectional area of the dispersion orifices that connect the secondary lateral conduits to the bed. Thus, most of the expansion of the air occurs within the distributor as it passes from the primary to the secondary laterals, where it cannot disrupt the bed. The gas forms a low pressure blanket at the top of the secondary conduits, and passes up through the dispersion orifices into the bed with minimal expansion. As a result, gravel support layers can be placed on filter bottoms using this invention without being disrupted.

Yet another object of this invention is to provide a distributor that compensates for variations in the amount of liquids supplied to the primary conduits of a dual lateral system. This is accomplished by connecting at least some of the secondary conduits to at least two primary conduits. Thus, backwashing liquid can flow from one primary conduit across a secondary conduit to another primary to compensate for variation in the amount of fluid supplied to or flowing along the primaries.

Other objects and advantages of this invention will be apparent from the following detailed description.

DETAILED DESCRIPTION

Figure 1:
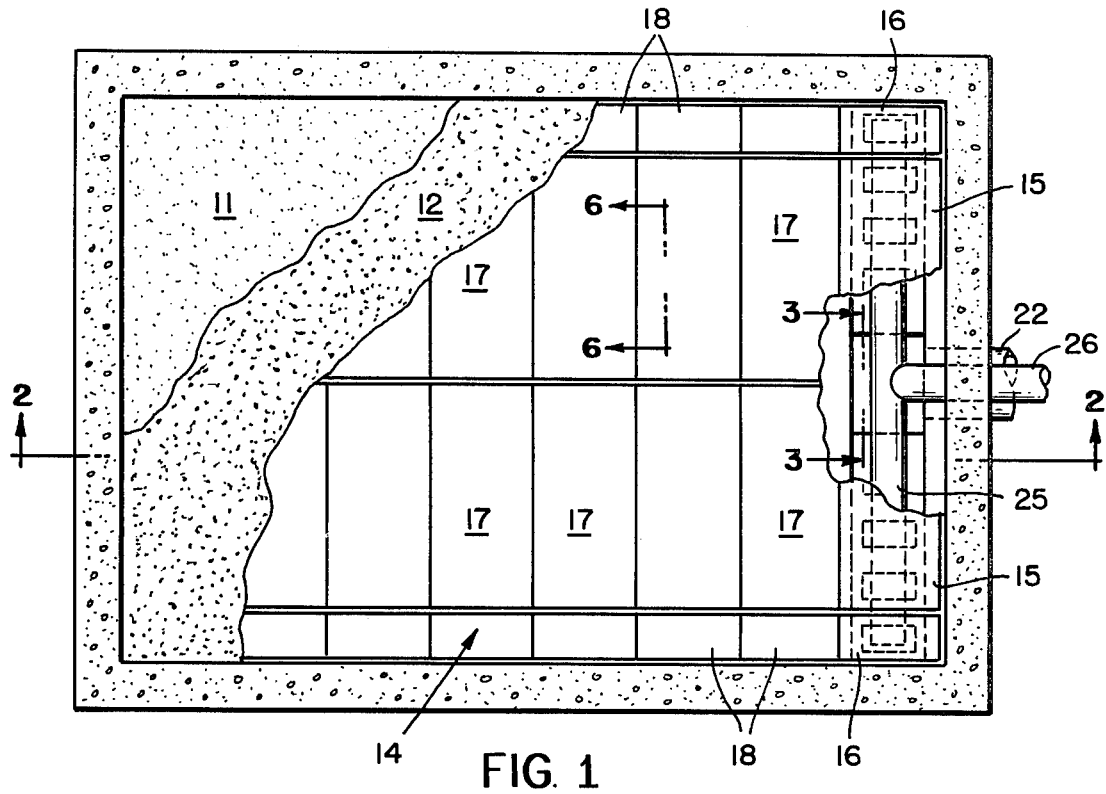
FIG. 1 is a partially cut away plan view of a filter embodying this invention.
Figure 2:
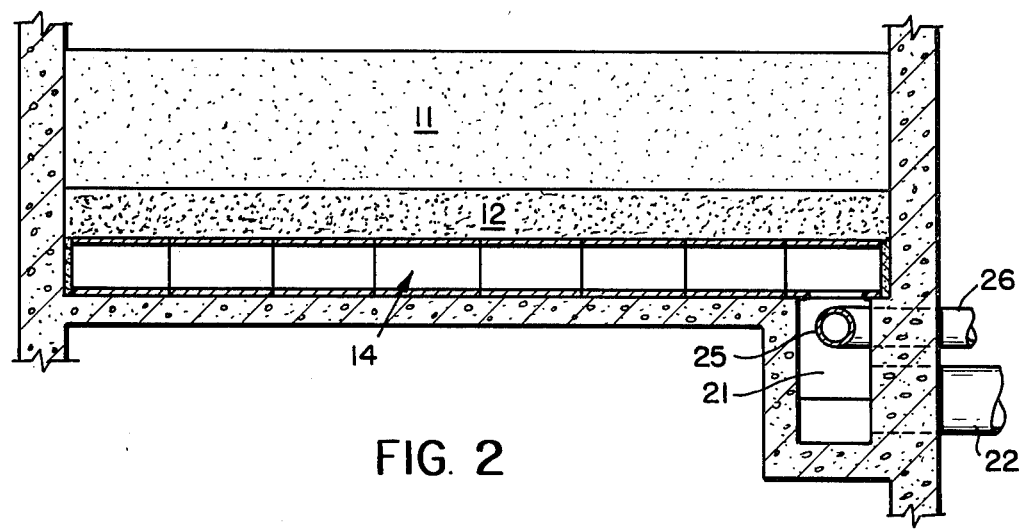
FIG. 2 is a cross-sectional elevation view along lines 2—2 of FIG. 1.
Figure 3:
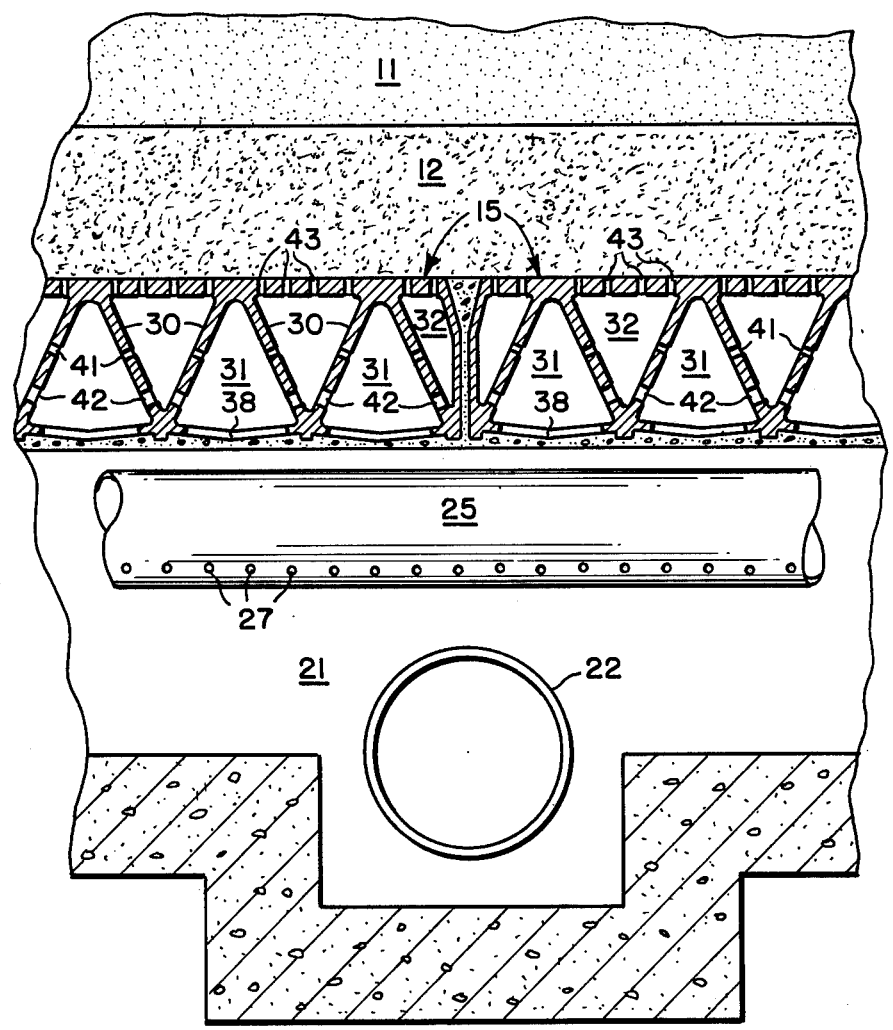
FIG. 3 is a fragmentary cross-sectional elevation view along lines 3—3 of FIG. 1.

Referring to FIGS. 1-3, the illustrated filter has a bed of sand 11 or similar filter media and a layer of a support media such as gravel 12 resting on a filter bottom or distributor 14, which consists of filter blocks 15, 16, 17, 18 assembled in a plurality of parallel adjacent rows. Water or other liquid being filtered passes down through the sand and gravel, into the filter bottom, and from there into a flume 21. The water leaves the flume through outlet pipe 22, which also supplies backwashing fluid, usually water, to the filter. The flume also contains a gas manifold 25, connected to a gas supply line 26, that supplies air or other gas during backwashing.

As may be seen in FIGS. 3-6, each block is divided by inclined planar walls 30 into primary lateral conduits 31 and secondary lateral conduits 32. The secondary conduits 32 are placed beside the primary conduits 31, instead of above them as in the blocks shown in the Stuppy patent, so that the blocks will accomodate a gas such as air during backwashing as well as liquid. However, since both the primary and the secondary lateral conduits have substantially triangular cross-sections, with the sides of the secondary laterals being defined by the tops 34 of the filter blocks 15, 16, 17, 18 and the inclined interior walls 30 or the side walls 35 of the blocks, almost all of the upper surface of the filter bottom is adjacent to a secondary conduit, and either gas or liquid can be dispensed evenly throughout the bed during backwashing.

The ends of these blocks are open, and the blocks are placed end to end in parallel adjacent rows so that each primary and each secondary conduit extends from block to block along the row, or from the end of the filter next to the flume 21 to the opposite end of the filter. Thus, backwashing liquid can flow along the secondary conduits to compensate for inequalities in flow from the primaries to the secondaries in the same manner as in the system shown in the Stuppy patent.

Each row of blocks contains one block 15, 16 positioned over the flume 21. These blocks contain cut-outs or ports 38, best seen in FIGS. 4 and 5, through which the filtered water can pass from the primary conduits into the flume and through which backwashing water and air can pass from the flume into the primary laterals. The blocks 17, 18 that are placed end to end with the flume blocks 15, 16 and with each other to form the parallel adjacent rows extending across the filter do not contain the flume cut outs or ports 38. In all other respects these blocks are the same as the flume blocks.

The inclined walls 30 that separate the primary and secondary lateral conduits contain gas metering orifices 41, located at an intermediate level in the walls, and liquid metering orifices 32 positioned below the gas metering orifices. The gas metering orifices control the rate at which the backwashing gas, usually air, passes from the primary to the secondary laterals. The liquid metering orifices, and to a lesser extent the gas metering orifices, control the flow rate of the liquid backwashing medium.

Figure 4:
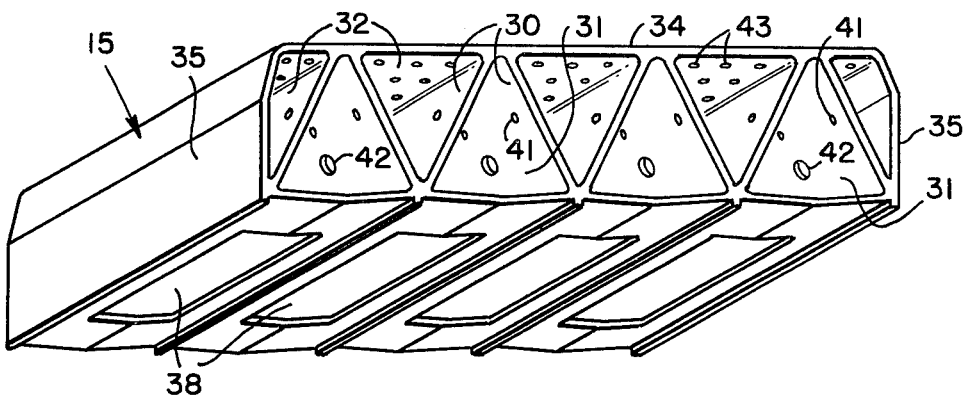
FIGS. 4 and 5 are oblique projections of individual filter blocks of the type used to straddle a flume through which backwash liquid and gas are introduced.
Figure 5:
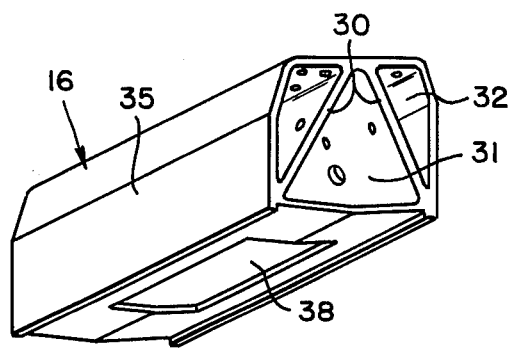

As may be seen in FIGS. 1, 4 and 5, two different widths of block are used in the filter. The blocks 15, 17 in the central portion of the filter are relatively wide, whereas narrower blocks 16, 18 are used at the sides of the filter to achieve the desired overall width. The wider blocks are used in the central portion so that each block can contain several primary lateral conduits. The liquid metering orifices in these wider blocks are arranged so that at least some of the secondary lateral conduits are each fed from two primary conduits through orifices 42 that are aligned with each other. This allows the backwashing liquid to flow from one primary conduit to another across an intervening secondary to compensate for inequalities of flow to the individual primaries, such as might occur if one primary were partially blocked or through roughness at the entrance to the primaries, construction tolerances or the like.

This system can be used with liquid backwashing or with gas and liquid backwashing. When both types are used, the filter is usually backwashed first with air in order to thoroughly agitate the filter media and dislodge accumulated dirt and gelatinous floc. The filter is then backwashed with water to remove the loosened impurities.

Figure 6:
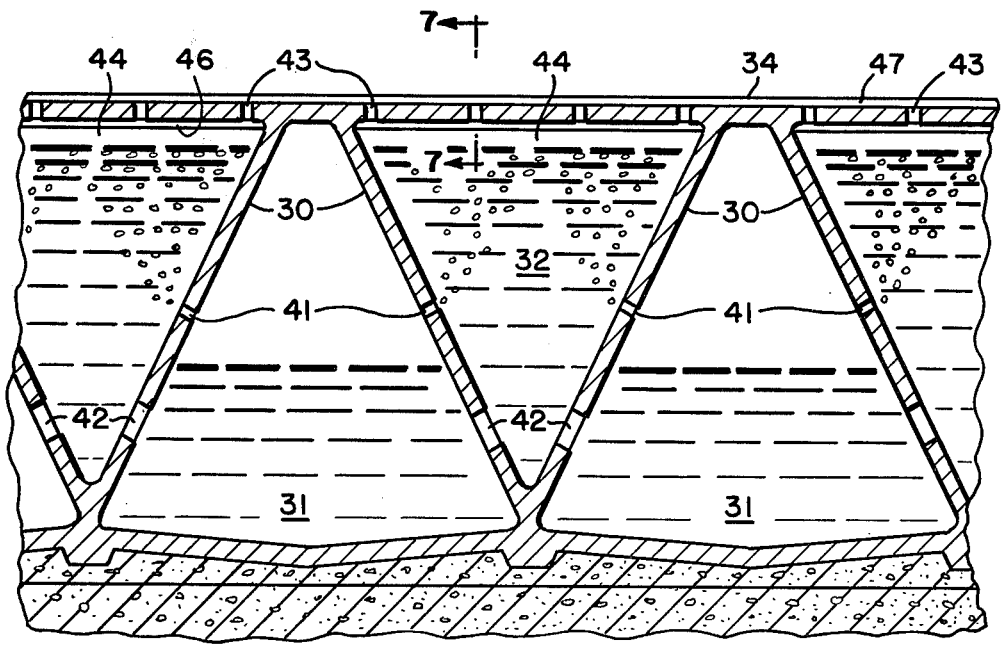
FIG. 6 is a fragmentary cross-sectional view, taken along lines 6—6 of FIG. 1, of a filter block of the type placed end to end to form parallel adjacent rows of blocks extending from the flume blocks to the other side of the filter.

During gas backwashing, the air or other gas is supplied through pipe 26, passes through gas distribution orifices 27 in the manifold 25 that extends along flume 21, and bubbles up through the flume ports 38 into the primary lateral conduits 31. As is best shown in FIG. 6, the air collects in pockets at the top of the primary laterals and depresses the liquid level in these laterals below the gas metering orifices 41. Air then passes through these orifices and forms thin blankets 44 at the top of the secondary lateral conduits 32. From there it passes through secondary dispersion orifices 43 into the filter bed.

The rate at which air is supplied to the secondary laterals is controlled by the effective air pressure in the primary laterals 31, which in turn is controlled by the level of the air/water interface in these laterals. The control provided by changes in the heighth of this interface enables this system to handle widely varying flow rates. With proper sizing of the orifices, the illustrated system can distribute air uniformly throughout the filter bed at rates varying from less than 0.5 to more than 5 standard cubic feet per minute (SCFM) per square foot of filter area. This range is considerably larger than the range provided by most currently available air distribution systems.

Preferably, the gas metering orifices are sized so that the air/water interface in the primary laterals will be depressed at least ½ inch below the gas orifices at the lowest flow rate the system is designed for. This ensures that all of the gas orifices will be exposed even if the filter blocks are slightly out of level. Ribs 46 extending transversely across the top of each secondary lateral, which may be seen in FIGS. 6 and 7, prevent air from migrating to the high point in the secondary laterals if the blocks are installed slightly out of level. The ribs do not extend to the bottom of the air blankets 44 at the top of the secondary laterals; thus, air can flow along the secondaries to compensate for inequalities in the flow of air from the primary to the secondary laterals.

Adequate depression of the air/water interface may be achieved at a flow rate of 0.5 SCFM per square foot of filter surface, with the illustrated system, by using four 3/16 inch diameter gas metering orifices per square foot of filter surface. With this arrangement, the liquid metering orifices 42 are preferably placed about 3½ inches below the gas metering orifices to insure that the air/water interface is not depressed enough to expose any of the liquid metering orifices at air flows up to 5 SCFM per square foot of filter surface.

This arrangement of gas orifices also makes the total cross-sectional area of these orifices much smaller than the total cross-sectional area of the secondary dispersion orifices. In order to handle the flow of water during liquid backwashing, which may range from about 10 to about 25 GPM per square foot of filter surface, the total cross-sectional area of the secondary dispersion orifices is preferably about 1.2 square inches per square foot of filter surface, which can be provided with 24 ¼ inch diameter orifices per square foot of surface. This is more than 10 times the total cross-sectional area of the foregoing arrangement of gas metering orifices, which have a total cross-sectional area of about 0.11 square inches per square foot of filter surface. With this combination of cross-sectional areas, most of the expansion of the air occurs across the gas metering orifices, and very little occurs as the air passes through the secondary dispersion orifices. In fact, the pressure drop across the secondary dispersion orifice is so small that it is believed that the flow of air through these orifices is controlled by the surface tension of the water in or above the orifices. This surface tension apparently creates just enough back pressure in the secondary laterals to form a low pressure blanket of air at the top of these laterals, which insures uniform distribution of the backwash air throughout the filter.

Since there is no violent expansion of air entering the bed, gravel support layers can be used with these blocks. This in turn means that the secondary orifices do not have to be small enough to keep sand from passing through the orifices into the filter bottom. The large orifices permitted by this invention greatly reduce the probability of plugging.

Figure 7:
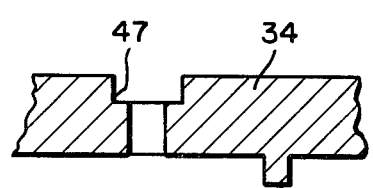
FIG. 7 is a detailed view taken along lines 7—7 of FIG. 6.

As may be seen in FIG. 7, the secondary dispersion orifices preferably open into slots 47 in the tops of the filter blocks. These slots prevent complete plugging of a secondary dispersion orifice by the gravel resting upon it. If the secondary dispersion orifices were flush with the top surface of the block, a large piece of gravel could be positioned directly over the orifice, completely plugging it. Recessing the orifices by means of the slot allows backwash liquid or gas to pass under any gravel blockage.

With the foregoing combination of cross-sectional areas, the illustrated system can supply about 5 SCFM of air per square foot of filter surface with a total head loss from the primary laterals to the bed of about 3 inches of water, which is considerably less than the head loss required by most other air distribution systems. Other air distribution systems generally depend upon the pressure drop across dispersion orifices to achieve good distribution. In the illustrated system, flow along the secondary laterals compensates for any inequalities in the air flow from the primaries and reduces the total pressure drop required to achieve good distribution, which provides an additional safeguard against explosive expansion of air.

While the foregoing arrangement is believed preferable, other combinations of orifices may be used. It is believed that most combinations wherein the total cross-sectional area of the secondary dispersion orifices is at least twice the total cross-sectional area of the air metering orifices will prevent explosive expansion of the air as it passes into the filter bed.

The gas metering orifices are positioned far enough down on the inclined walls 30 that separate the primary and secondary laterals so that the cross-sectional area of the primary laterals above the orifices is large enough to handle the desired flow rate of gas along the laterals. With the illustrated system, the preferred location is about 4 inches below the top of the blocks. Of course, the preferred position of these orifices can change with the length of the lateral conduit, the desired air flow rates, and the internal configuration of the blocks.

Since this system prevents explosive expansion of air, the gravel layer 12 above the filter bottom can be generally the same as gravel support layers used with standard liquid backwash systems; i.e., a layer of coarse gravel immediately above the filter bottom followed by layers of progressively smaller gravel. However, air backwashing can create eddy currents in the sand filter media, which can erode the top surface of the gravel. In order to prevent this erosion, it may be desirable to place a layer of relatively large gravel next to the sand.

After air backwashing, the flow of air to gas supply line 26 is shut off and backwash liquid is supplied through pipe 22. This backwash liquid passes along flume 21 and up through the flume ports 38 into the primary lateral conduits 31. The incoming backwash water raises the air/water interface in the primary laterals at least to the level of the gas metering orifices, passes through both the liquid metering orifices 42 and gas metering orifices 41 into the secondary lateral conduit, and from there passes through the secondary dispersion orifices 43 into the filter bed. The air/water interface in the primary laterals will usually be raised somewhat above the gas metering orifices during liquid backwashing because the pressure drop in the primary laterals to the filter bed will usually be somewhat higher during liquid backwashing. Thus, the air at the top of the primary laterals is compressed by the backwash water. This air may be left in the primary laterals during liquid backwashing to provide a cushion that protects against water hammer in the blocks; or it may be bled out to provide additional cross-sectional area for liquid flow along the primary laterals. In most applications, it is believed that it will be preferable to leave the air in the primary laterals.

Additional flow area for liquid, or gas, can also be provided by modifying the internal configuration of the blocks. For example, the liquid flow area can be increased by using "Y" shaped internal walls, so that the secondary laterals do not extend to the bottom of the blocks. The liquid or gas flow areas can also be increased by using curved interior walls in place of the illustrated planar walls 30. Various other modifications will be apparent to those skilled in the art.

With the illustrated system, the cross-sectional areas of the various orifices are preferably sized so that about two-thirds of the pressure drop from the primary laterals to the filter bed during liquid backwashing occurs as the liquid passes from the primaries to the secondaries and about one third takes place across the secondary dispersion orifices. Since most of the backwash water flows through the liquid metering orifices 42, the pressure drop ratio will depend chiefly upon the sizing of the liquid metering orifices and the secondary dispersion orifices. However, the gas metering orifices will have a slight affect.

With the arrangement of gas metering orifices and liquid metering orifices described above, the preferred ratio of pressure drops can be achieved with two ⅜ inch diameter liquid metering orifices per square foot of filter area, which yields a total cross-sectional area for the liquid metering orifices of 0.9 square inches per square foot of surface area.

This arrangement of orifices will supply backwash water to the filter bed with considerably less head loss than most filter bottoms. Other designs usually depend upon the head loss across the dispersion orifices to distribute the water throughout the bed. In the filter blocks of this invention, as in the system shown in the Stuppy patent, uniform distribution of the backwash water is achieved by compensating flow of the liquid along the secondary laterals. Thus, better distribution of water is achieved with less pressure drop. Since the pressure drop is less, air remaining in the secondary laterals after air backwashing, or air that accumulates in the secondaries through other causes, will not expand explosively as it enters the filter bed. Thus, disruption of the gravel support layer is avoided.

Figure 8:
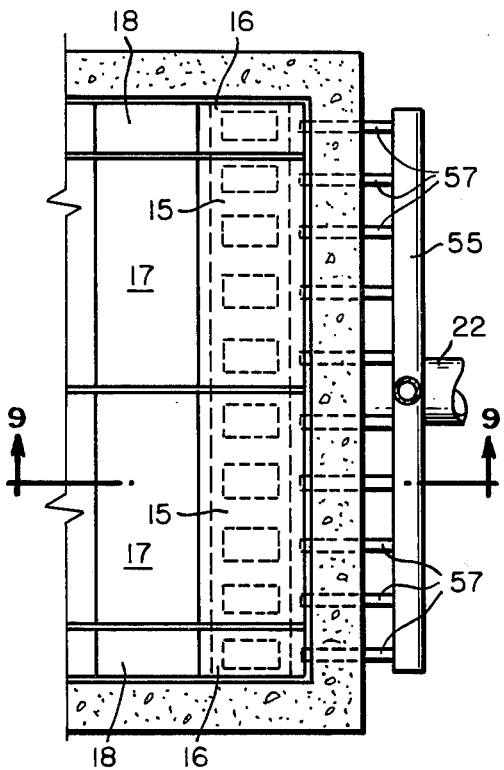
FIG. 8 is a fragmentary plan view of another embodiment of this invention.
Figure 9:
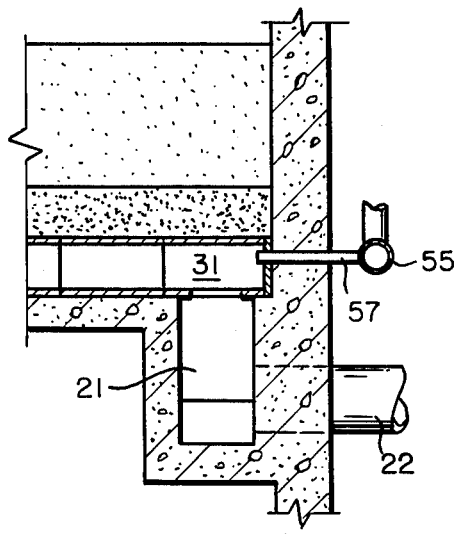
FIG. 9 is a cross-sectional elevation view along lines 9—9 of FIG. 8.

FIGS. 8 and 9 illustrates an alternative version of this invention. In this version, the gas is supplied to the primaries by individual pipes 57 connected to an air manifold 55 located outside the filter bed. One of the pipes 57 extends into each primary lateral, preferably near the top of the lateral. This facilitates bleeding at least some of the air out of the laterals to provide additional area for liquid flow during liquid backwashing, if this is desired. In all other respects, this version is the same as the one illustrated in FIGS. 1–7.

Figure 11:
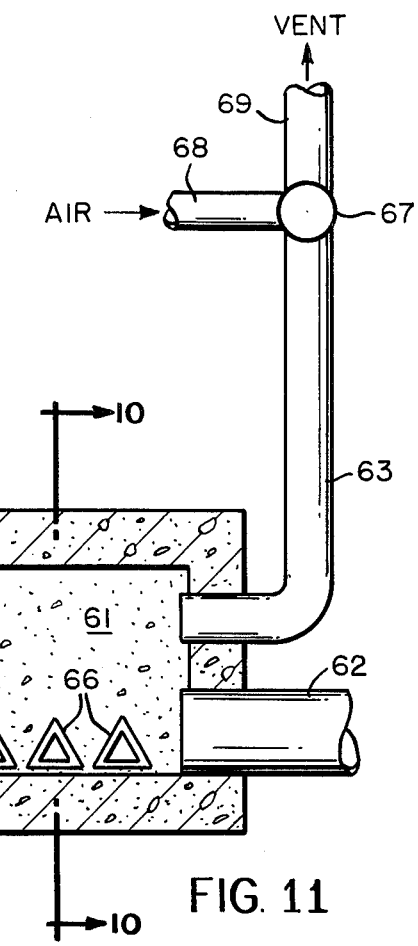
FIG. 11 is a cross-sectional elevation view along lines 11—11 of FIG. 10.
Figure 10:
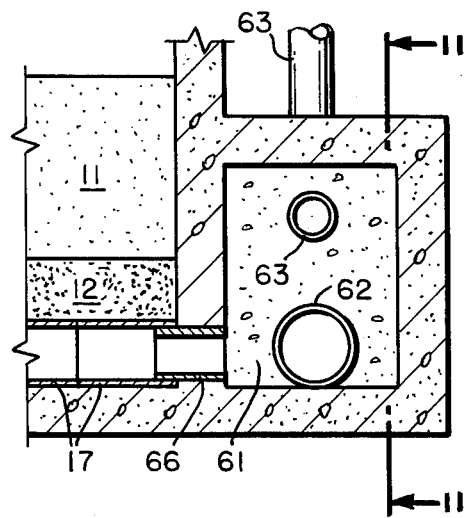
FIG. 10 is a cross-sectional elevation view, taken from the same vantage point as FIGS. 2 and 9, of yet another embodiment of this invention.

FIGS. 10 and 11 illustrate another alternative version. In this system, the flume 61 is positioned beside the filter, at one end of the primary conduits, instead of beneath the conduits as in the filters shown in FIGS. 1–9. The primary laterals 31 are connected to the flume by short triangular shaped connectors or wall-sleeves 66 that extend from the flume 61 through the wall of the filter bed into the primary laterals.

Filtered water is discharged from the flume, and backwash water supplied, through an outlet pipe 62 connected to one end of the flume 61. Air for backwashing is supplied through line 63, also connected to one end of the flume. Line 63 contains a three way valve 67, which alternately connects the line to a gas supply line 68 and to a vent line 69.

During air backwashing, the air supplied through line 63 depresses the water level in the primary laterals, and in flume 61, below the level of the gas metering orifices 41 that feed the air to the secondary laterals. At the end of the air backwashing cycle, the air is bled out of the primary laterals and the flume to provide room for the flow of backwash water.

All three of the foregoing embodiments provide mechanically simple systems that distribute either liquid or gas backwashing agents uniformly throughout the filter bed. Furthermore, the low pressure drops required to achieve this uniform distribution minimize the danger of explosive expansion of air entering the filter bed. Thus, the filter bottoms of this invention can be used with gravel support layers, which simplify construction and installation of the system and minimize plugging of the filter bottom.

Of course, it will be understood that the system described above is merely illustrative and that many changes may be made by those skilled in the art. For example, the filter bottom may be constructed of formed sheets and plates, instead of the illustrated blocks. Similarly, although the invention has been described in connection with the air backwashing of a sand filter, it is equally applicable in many other situations where a liquid or a liquid and a gas must be distributed throughout a bed of granular media, such as ozone treatment of tertiary filters, granular carbon adsorption systems, which may be operated either upflow or downflow and typically require periodic contact with an oxygen containing gas to prevent septicity, sludge drying beds, and ion exchange systems. These and may other modifications may be made within the scope of this invention, which is defined by the following claims.

I claim:

1. In a system for distributing a liquid uniformly throughout a bed of granular media, including:

a distributor positioned beneath and supporting said media, said distributor being divided into primary horizontal conduits and secondary horizontal conduits that extend parallel to said primary horizontal conduits and containing liquid metering orifices that connect said primary conduits to said secondary conduits and dispersion orifices that connect said secondary conduits to said bed of granular media;

a flume extending transverse to said primary conduits and connected to each of said primary conduits; and means for supplying a liquid to said flume, whereby said liquid flows from said flume to said primary conduits, through said liquid metering orifices into said secondary conduits, and through said dispersion orifices into said bed;

the improvement comprising:

a plurality of inclined walls separating said primary conduits from said secondary conduits, whereby said secondary conduits are positioned beside said primary conduits, said primary conduits have an upwardly tapering cross-section and said secondary conduits have a downwardly tapering cross-section;

gas metering orifices located at an intermediate level in said inclined walls and defining a gas flow passage above said gas metering orifices in said primary conduits, said liquid metering orifices being positioned beneath and separated from said gas metering orifices in said inclined walls; and means for supplying a gas to said primary conduits, whereby said gas passes through said gas metering orifices into said secondary conduits and through said dispersion orifices into said bed.

2. A system according to claim 1 wherein said flume is positioned beneath said primary conduits and connected to the primary conduits by ports in the bottom of each conduit.

3. A system according to claim 2 wherein the means for supplying a gas to said primary conduits comprises a manifold positioned in said flume.

4. A system according to claim 1 wherein said flume is positioned at one end of said primary conduits and each primary conduit is connected to said flume by a connector that extends from the flume into said conduit.

5. A system according to claim 1 wherein the means for supplying a gas to said primary conduits comprises a manifold and pipes extending from said manifold into said primary conduits.

6. A system according to claim 1 wherein the total cross-sectional area of said gas metering orifices is substantially less than the total cross-sectional area of said dispersion orifices.

7. A system according to claim 6 wherein the cross-sectional area of said dispersion orifices is at least twice the total cross-sectional area of said gas metering orifices.

8. A system according to claim 6 wherein the total cross-sectional area of said dispersion orifices is about ten times the total cross-sectional area of said gas metering orifices.

9. A system according to claim 1 wherein said inclined walls are planar.

10. A system according to claim 9 wherein said primary conduits and said secondary conduits have substantially triangular cross-sections.

11. A system according to claim 1 wherein said distributor comprises a plurality of blocks arranged in parallel adjacent rows and said primary and secondary conduits extend from block to block along said rows.

12. A system according to claim 1 wherein said bed of granular media comprises a layer of gravel above said distributor and a layer of sand above said layer of gravel.

13. In a system for distributing a liquid uniformly throughout a bed of granular media, including:
   a distributor positioned beneath and supporting said media, said distributor being divided into primary horizontal conduits and secondary horizontal conduits that extend parallel to said primary horizontal conduits and containing liquid metering orifices that connect said primary conduits to said secondary conduits and dispersion orifices that connect said secondary conduits to said bed of granular media;
   a flume extending transverse to said primary conduits and connected to each of said primary conduits; and
   means for supplying liquid to said flume, whereby said liquid flows from said flume to said primary conduits, through said liquid metering orifices into said secondary conduits, and through said dispersion orifices into said bed;
   the improvement wherein:
   the secondary conduits have a substantially triangular cross-section;
   the top of said distributor defines one side of said secondary conduits and inclined planar walls that separate the primary conduits from the secondary conduits define another side of said secondary conduits; and
   at least some of the secondary conduits are connected to different primary conduits by liquid metering orifices that are aligned with each other and located near the intersection of two of said inclined planar walls, whereby liquid can flow from a primary conduit through a secondary conduit to another primary conduit.

14. A system according to claim 13 wherein said distributor comprises a plurality of blocks arranged in parallel adjacent rows and said primary and secondary conduits extend from block to block along said rows.

* * * * *